United States Patent [19]
Barker et al.

[11] Patent Number: 5,130,924
[45] Date of Patent: Jul. 14, 1992

[54] SYSTEM FOR DEFINING RELATIONSHIPS AMONG DOCUMENT ELEMENTS INCLUDING LOGICAL RELATIONSHIPS OF ELEMENTS IN A MULTI-DIMENSIONAL TABULAR SPECIFICATION

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 213,429

[22] Filed: Jun. 30, 1988

[51] Int. Cl.$^5$ .............................................. G06F 7/24
[52] U.S. Cl. .................................. 364/419; 395/700; 364/222.9; 364/DIG. 1; 364/DIG. 1
[58] Field of Search ................. 364/419; 395/600, 650, 395/700

[56] References Cited

U.S. PATENT DOCUMENTS

| | | | |
|---|---|---|---|
| 4,503,516 | 3/1985 | Agnew et al. | 364/900 |
| 4,546,434 | 11/1985 | Gioello | 364/400 |
| 4,648,061 | 3/1987 | Foster | 364/900 |
| 4,723,209 | 2/1988 | Hernandez et al. | 364/300 |
| 4,833,594 | 5/1989 | Familetti et al. | 364/200 |
| 4,876,665 | 10/1989 | Iwai et al. | 364/900 |
| 4,912,669 | 3/1990 | Iwamoto et al. | 364/900 |
| 4,959,769 | 9/1990 | Cooper et al. | 364/200 |

Primary Examiner—Thomas C. Lee
Assistant Examiner—Ayni Mohamed
Attorney, Agent, or Firm—Andrew J. Dillon

[57] ABSTRACT

A method is disclosed for defining the structure of a document by specifying the relationships between document elements in a data stream. A plurality of tabular specifications are provided, each of which includes a number of document elements. The logical relationship between each document element and all other document elements within each tabular specification is specified once for the entire tabular specification. The semantic interpretation for each tabular specification is associated with a named reference to that tabular specification so that multiple references to that tabular specification may yield different semantic interpretations. In this manner, it is possible to minimize the amount of specification to define a document by utilizing individual tabular specifications repeatedly. Additionally, a reference to a tabular specification may be utilized to modify the existing logical relationship between the document elements contained therein. In a preferred embodiment of the present invention, a range of allowable values for individual document elements within a tabular specification may be specified by the user.

10 Claims, 4 Drawing Sheets

SYSTEM FOR DEFINING RELATIONSHIPS AMONG DOCUMENT ELEMENTS INCLUDING LOGICAL RELATIONSHIPS OF ELEMENTS IN A MULTI-DIMENSIONAL TABULAR SPECIFICATION

BACKGROUND OF THE INVENTION

1. Technical Field

The present invention relates in general to digital communications and in particular to methods for defining the structure of a document within a data stream. Still more particularly, the present invention relates to methods for defining relationships between document elements utilized in both logical and layout document definitions.

2. Background Art

Text processing applications are well known in the prior art. Such applications typically utilize data streams which include embedded formatting and textual commands. These commands generally vary from one application program to another. Revisable Format Text Document Content Architecture (RFTDCA) was developed to provide for the interchange of data streams from different text processing applications and to allow for the consistent interpretation of embedded formatting and textual commands.

The International Standards Organization (ISO) has defined standards for document processing and interchange. Specifically, the Standard Generalized Markup Language (SGML), publication 8879, and Office Document Architecture/Office Document Interchange Facility (ODA/ODIF), publication 8613, are two such standards. SGML is a syntax language represented by character text and may be utilized to define the specifications for publishing systems. Generic markup, that is, identification of the role of document elements rather than how to present those elements, is the basis of SGML.

In current architectures, such as SGML, the definition of a structure of a document includes expressions which define the relationships of document elements utilizing special characters which have assigned meanings relating to element relationships. In addition, the type of expression (i.e. Document Content; Attribute etc.) is directly associated with the expression itself. Thus, known architectures require replicated specifications for like parameters.

Additionally, known architectures generally require adherence to strict punctuation requirements and positional semantics wherein variations in the position of a character may have a substantial effect on the resultant semantics.

SUMMARY OF THE INVENTION

It is therefore one object of the present invention to provide an improved method for defining the relationships between document elements.

It is another object of the present invention to provide an improved method for defining the relationship between document elements which utilizes a consistent punctuation which is independent of expression type.

It is yet another object of the present invention to provide an improved method for defining the relationships between document elements which permits additional elements to be simply added to a document.

The foregoing objects are achieved as is now described. In accordance with the method of the present invention, a plurality of tabular specifications are provided, each of which includes a number of document elements. The logical relationship between each document element and all other document elements within each tabular specification is specified once for the entire tabular specification. The semantic interpretation for each tabular specification is associated with a name reference to that tabular specification so that multiple references to that tabular specification may yield different semantic interpretations. In this manner, it is possible to minimize the amount of specification necessary to define a document by utilizing individual tabular specifications repeatedly. Additionally, a reference to a tabular specification may be utilized to modify the existing logical relationship between the document elements contained therein. In a preferred embodiment of the present invention, a range of allowable values for individual document elements within a tabular specification may be specified by the user.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
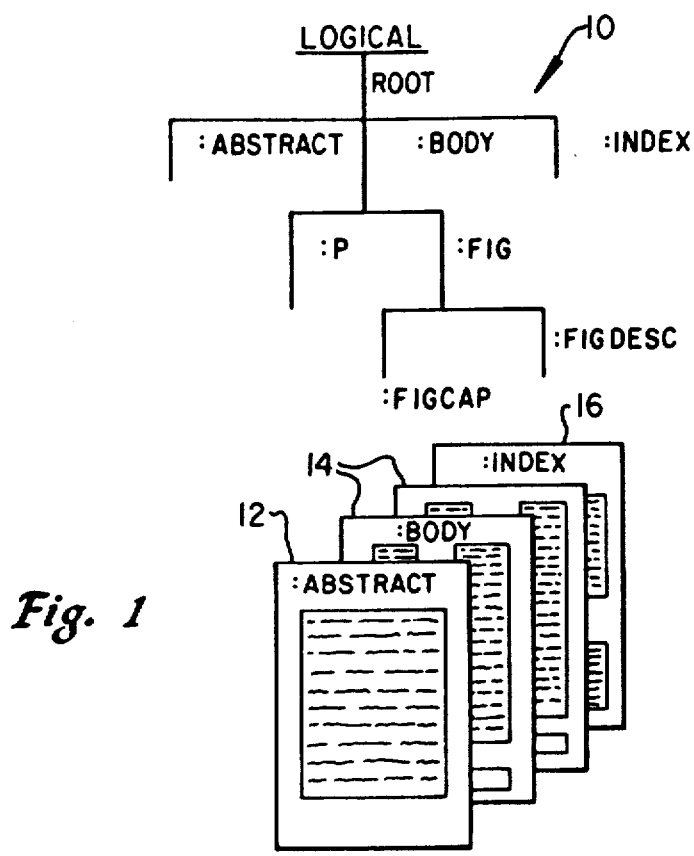
FIG. 1 is a graphic representation of the logical definition of a document structure including a pictorial representation of the resultant document.

With reference now to the figures and in particular with reference to FIG. 1, there is depicted a graphic representation 10 of the logical definition of a document structure. As can be seen, the definition of the document structure includes a root which is comprised of three separate elements. That is, the abstract, the body, and the index. In the illustrated graphic representation of a document structure, the body of the document includes a paragraph element (:P) and a figure element (:FIG). In still greater detail, the figure element includes a figure caption element (:FIGCAP) and a figure description element (:FIGDESC).

Of course, those skilled in the art will appreciate that the generalized list directed expression architecture of the present invention may be utilized to specify definitions other than document logical definitions. For example, a layout definition which comprises multiple pages, each page having separate defined areas within that page may also be specified utilizing the method of the present invention. Similarly, an index structure that allows document elements such as a specific page or a resource to be individually accessed also may utilize this invention. Still more generally, the architecture incorporated in the method of the present invention may also be utilized to define the relationships between elements in a boolean set or arithmetic expression.

Also depicted within FIG. 1 is a pictorial representation of a resultant document which may be defined in accordance with logical definition 10. As can be seen, the document includes an abstract 12, a body portion 14 and an index 16 in a format well known to those skilled in the document processing art.

Figure 2:
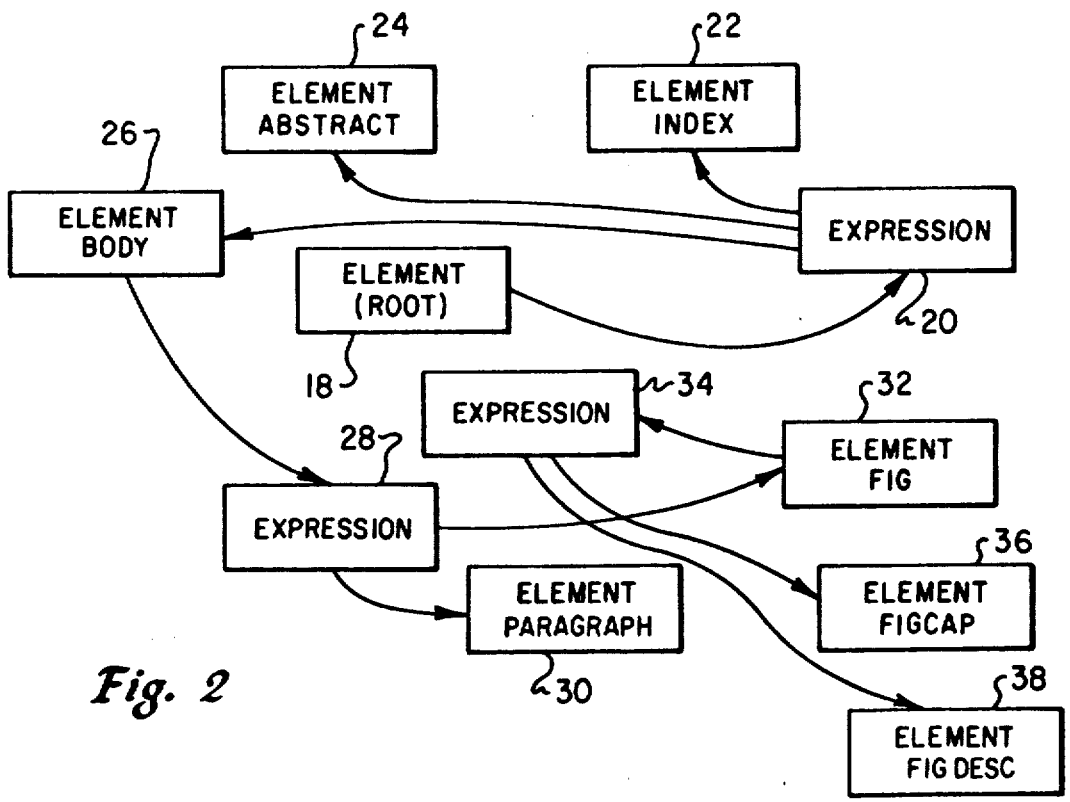
FIG. 2 is a block diagram of a list directed expression architecture which defines the document structure of FIG. 1.

With reference now to FIG. 2, there is depicted a block diagram of list directed expression architecture which may be utilized to define the document structure of FIG. 1. As is illustrated, the architecture utilized in accordance with the method of the present invention is a generalized N-dimensional architecture wherein individual elements or expressions within the architecture are linked directly to other elements/expressions by semantic references thereto. As can be seen, the element root 18 is linked to expression 20 which includes references to elements 22, 24 and 26, that is the index, abstract, and body of the root document respectively. Similarly, element 26 includes a reference to expression 28 which references elements 30 and 32. Elements 30 and 32, in the depicted embodiment, are the paragraph element and figure element.

As above, element 32 includes a reference to expression 34 which refers to elements 36 and 38. Element 36 illustrates the figure caption element and element 38 depicts the figure description element. While not illustrated in this particular example, those ordinarily skilled in the art will appreciate upon reference to the following specification that by utilizing the generalized list directed expression architecture of the present invention, it is possible to repeatedly refer (by semantic name type) to a single element within the N-dimensional architecture so that individual elements may be utilized repeatedly without the necessity for replication in the specification.

Figure 3:
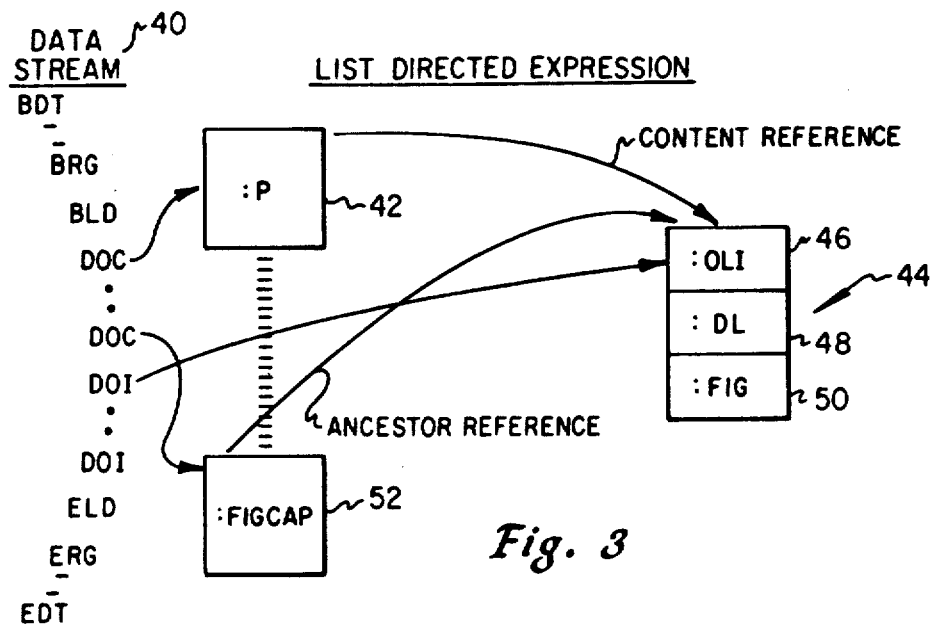
FIG. 3 is a depiction of a generalized data stream and a graphic illustration of multiple references to a single expression which incorporate different semantic interpretations.

Referring now to FIG. 3, there is depicted a generalized data stream 40 which begins with a begin document structured field (BDT) and a begin resource group structured field (BRG). Next, a begin logical document structured field (BLD) precedes a plurality of document control logical elements (DOC) and document index expressions (DOI). Finally, an end logical document structured field (ELD), and end resource group structured field (ERG) and an end document structured field (EDT) are utilized to indicate the end of data stream 40.

As can be seen, one of the document control logical elements (DOC) may be utilized to specify to a paragraph element 42 (P). Paragraph element 42 may, in accordance with the method of the present invention, include a reference to document index expression 44 (DOI) which includes, in the illustrated example of the present method an ordered list item 46 (:OLI), a definition list 48 (:DL) and a figure element (:FIG) 50.

In accordance with the method of the present invention, the reference to document index expression 44 includes a semantic reference to the manner in which the same document index structured field will be utilized. For example, paragraph element 42 may make a content reference to document index 44 in a manner which will be explained in greater detail herein.

Still referring to FIG. 3, it can be seen that a second document control logical element may be utilized to specify to a figure caption element 52 (:FIGCAP) which may also include a reference to document index 44. However, in accordance with a novel feature of the present invention, the reference by figure caption (:FIGCAP) 52 to document index 44 may include a semantic reference wherein the elements of document index 44 are referred to as ancestor logical elements in a manner which will be explained in greater detail herein.

Thus, it should be apparent that the method of the present invention permits a single document index to be referred to a number of times and that by incorporating a semantic within the reference, different elements of the document may utilize the same expression which minimizes the amount of element replication which might otherwise be necessary to define the document structure.

Figure 4:
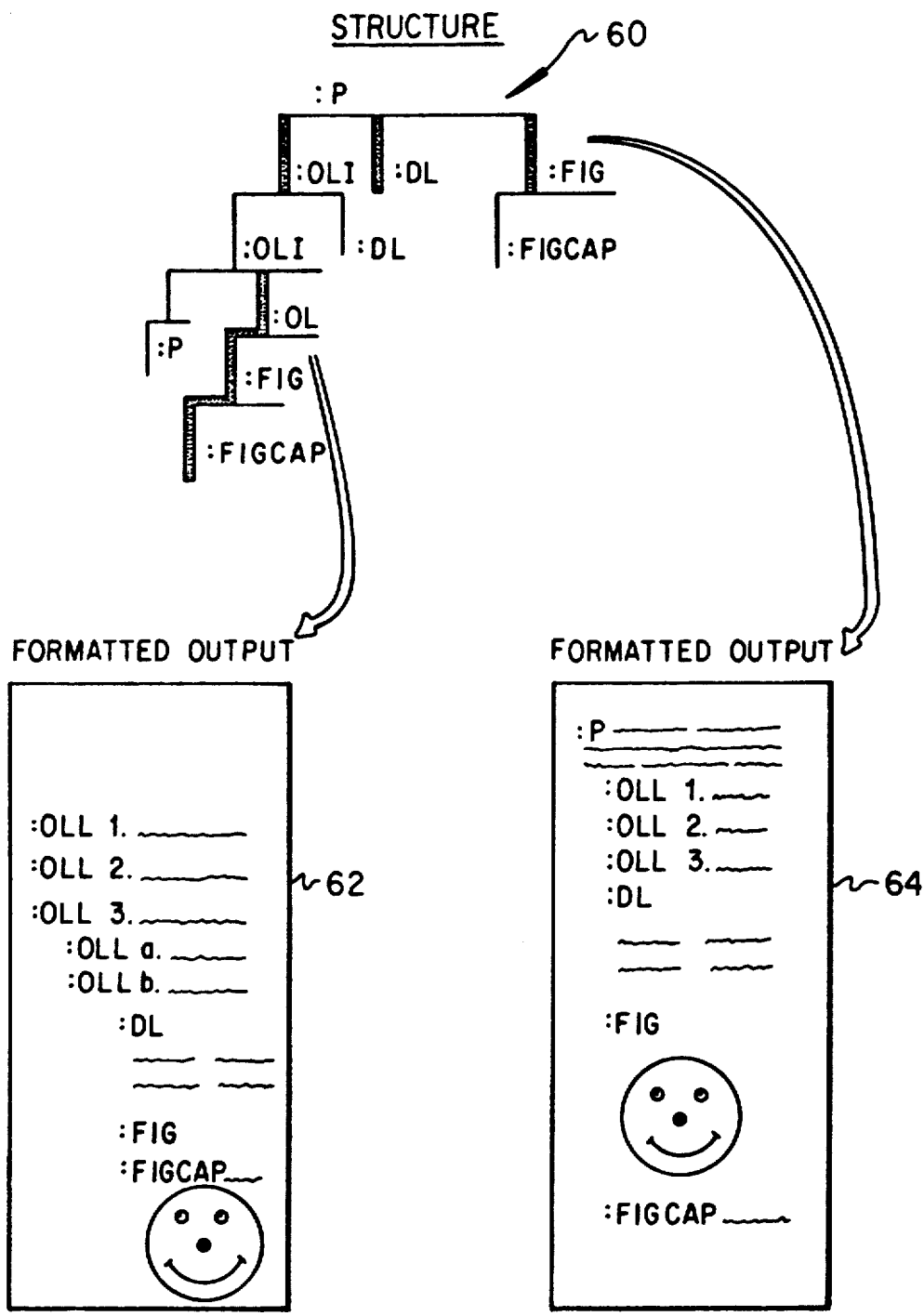
FIG. 4 is a graphic representation of the logical definition of a document structure which may incorporate multiple references to a single expression and the resultant formatted outputs.

Referring now to FIG. 4, there is depicted a graphic representation of a logical definition of a document structure which may be utilized to illustrate the multiple references to a single expression referred to with respect to FIG. 3. As can be seen, the logical definition 60 includes a paragraph element (:P) which includes as content an ordered list item (:OLI), a definition list (:DL), and a figure element (:FIG). Still referring to logical definition 60, it may be seen that the illustrated structure also includes two figure caption elements (:FIGCAP), one of which is preceded by a figure element (:FIG), a definition list element (:DL), and an ordered list item (:OLI). Thus, these three elements appear as a related group in more than one location within logical definition 60.

Referring back to FIG. 3, it may now be seen that a reference from figure caption element 52 to document index 44, with a semantic reference indicating that it is an ancestor reference, may be utilized to specify the logical structure which precedes the figure caption element in logical definition 60. Similarly, by utilizing a semantic reference which indicates content, paragraph element 42 may also refer to document index 44 since like parameters are included therein.

Referring again to FIG. 4, the possibility of different formatted outputs which result from the variation in the semantic content of a reference to a particular document index may be seen. As is illustrated, formatted output 62 is one example of a portion of a document which may be generated as a result of a reference to document index 44 which includes an ancestor semantic reference. In contrast, formatted output 64 illustrates one example of an output which may be generated by a content reference from paragraph element 42.

Figure 5:
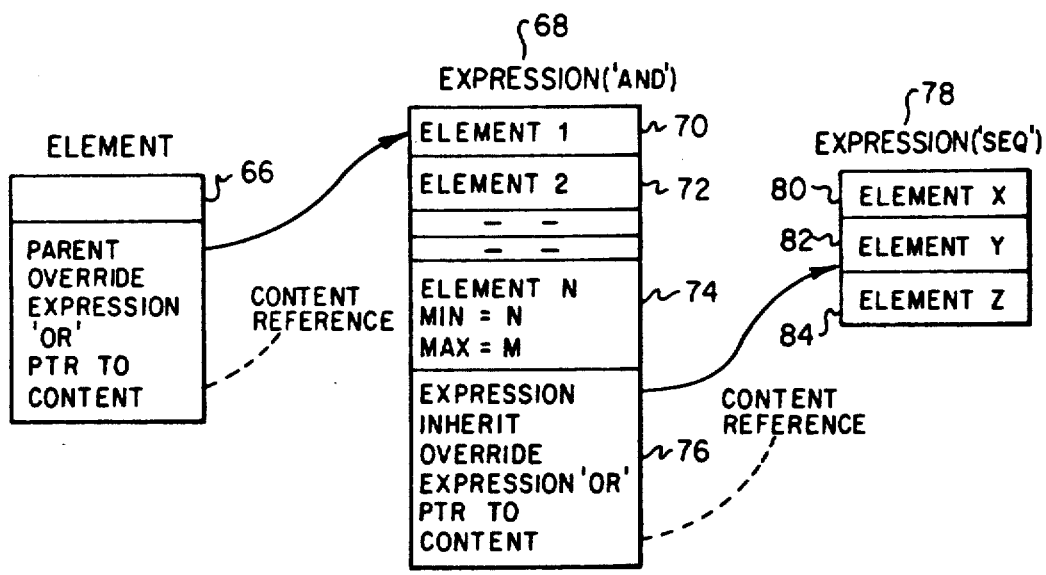
FIG. 5 is a block diagram of multiple expressions within a document structure which illustrate the control of logical relationships within each expression.

With reference to FIG. 5, there is depicted a block diagram of multiple expressions within a document structure which may be utilized to illustrate another important feature of the method of the present invention, wherein the logical relationship among elements of an expression may be specified once for the entire expression and may thereafter be selectively altered by hierarchial relationship overrides. As can be seen, element 66 includes a content reference to expression 68 and also provides an indication that the logical relationship of the elements within expression 68 is to be modified in accordance with the override content of element 66.

As is illustrated, expression 68 includes a specification of the logical relationship of the elements contained therein. This specification is the logical element "AND" which means that each element within expression 68 will generally be included. However, by inheriting the logical relationship "OR", expression 68 is now modified so that a reference thereto will permit only one element from within expression 68 to be utilized.

Similarly, expression 68 may also include a content reference to expression 78 which requires that the logical relationships between the elements of expression 78 be inherited from element 66. As can be seen, expression 78 was previously specified as including a sequential relationship between the elements contained therein. That is, element X is followed by element Y which is followed by element Z. By inheriting the logical relationship "OR" expression 78 will now be utilized to provide either element X, element Y, or element Z.

Thus, as is illustrated, the list directed expression architecture utilized in accordance with the method of the present invention includes multiple tabular specifications, each of which includes a single specification of the relationship of each element within the tabular specification to the remaining elements within the specification. However, in accordance with one feature of the present invention, it is possible for a tabular specification to inherit a logical relationship override from a previous expression or element so that the user may modify the logical relationship of elements within a particular tabular specification. Similarly, it may be seen that an inherited override of the logical relationship between elements within a tabular specification may also be passed on to a subsequent tabular specification by an appropriate reference thereto. In this manner, multiple expressions may be nested by utilizing the method of the present invention and the logical relationship of elements within each expression may be modified as desired by the user.

Figure 6:
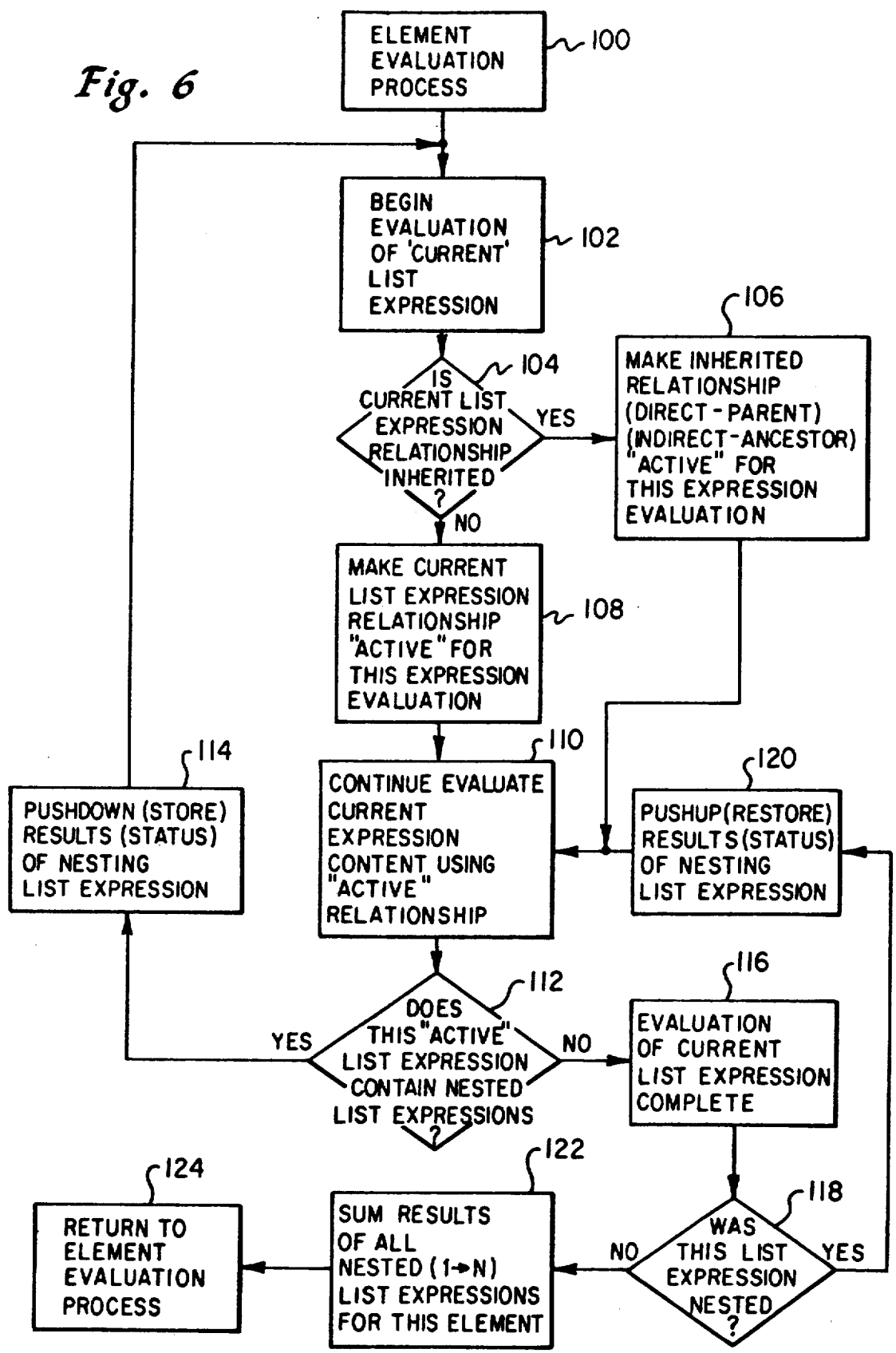
FIG. 6 is a logic flow diagram illustrating factored element relationships diagramed in FIG. 5.

Referring now to FIG. 6, there is depicted a logic flow diagram illustrating the method of the present invention describing the use of factored logical relationships. As can be seen, the program begins with the element evaluation process. Next, block 102 illustrates the beginning of the evaluation of the current list expression and block 104 illustrates the determination of whether or not the current list expression has inherited a relationship expression from a previous expression or element. If so, in block 106 the inherited relationship is made active for the current expression and the program proceeds to evaluate the current expression content utilizing this inherited relationship, as illustrated in block 110.

If the current list expression does not include an inherited relationship, block 108 illustrates the activation of the current list expression relationship as specified in that expression and block 110 depicts the evaluation of the current expression utilizing this particular relationship.

Next, block 112 is utilized to determine whether or not the active list expression contains a reference to a nested expression. If so, the results from the current evaluation of the nesting expression are stored and the process returns to block 102 to begin the evaluation of the nested list expression. If the current list expression does not contain a reference to a nested expression, block 116 illustrates the completion of the evaluation of the current list expression. Block 118 is then utilized to determine whether or not this list expression was nested. If this list expression was nested, block 120 illustrates the restoring of the results and relationship of the nesting expression before returning the evaluation process to block 110. If the list expression was not nested, block 122 illustrates the summing of the results for all nested list expressions and block 124 illustrates return to the element evaluation process of block 102.

As can be seen, the method of the present invention yields a large number of advantages over previously known document definition techniques. For example, the type of reference to a shared relationship expression may be utilized to yield a different semantic interpretation of the same expression. This will minimize the amount of specification needed to define a document's structure. For example, a document element relationship grouping may be referenced as the content of one logical element while another logical element may reference the same expression grouping as the logical elements which form the ancestors of a given logical element.

Additionally, those elements wherein the logical relationship between individual elements is identical need only specify that relationship once for a particular expression. That is, the logical relationship "AND", "OR", "SEQUENTIAL" etc. as relates to each element within a relationship may be factored and specified only once for all elements which comprise an expression wherein the elements possess the same logical relationship among all member elements. This also minimizes the specification of element relationships and permits the parsing component of an expression interpreter to generate intelligence concerning succeeding element relationships.

The generalized list directed expression architecture of the present invention also does not reserve characters to indicate relationships among a document's elements. The tabular expression format is also binary in nature. Thus, the architecture may be easily extended to handle additional constructs without affecting the names of existing document elements. Similarly, explicit value specification is possible by identifying the exact begin and end delimiter values for individual document elements within each expression. The definition of any expression is possible utilizing the list directed expression architecture of the present invention since the semantics are defined by a fully qualified name reference and all expressions within the architecture follow the same tabular format. As a result of the tabular format utilized, the relationship of all document elements within a referenced table is open-ended and new elements may be simply added.

Finally, the punctuation of each expression within the list directed expression architecture of the present invention is identical and independent of the particular expression type. This will result in an ease of operation not found in known architecture methods.

While the invention has been particularly shown and described with reference to a preferred embodiment, it will be understood by those skilled in the art that various changes in form and detail may be made therein without departing from the spirit and scope of the invention.

We claim:

1. A computer implemented method in a data processing system of defining relationships among elements in a multidimensional architecture, said computer implemented method comprising the steps of:

creating within said data processing system a plurality of tabular specifications, each of said tabular specifications including a plurality of elements;

specifying once for each of said plurality of tabular specifications the logical relationship between each of said plurality of elements contained therein and at least one other element contained therein;

storing said specified logical relationship in association with each of said plurality of tabular specifications;

accessing said plurality of tabular specifications and said associated specified logical relationships; and defining relationships among elements in a multidimensional architecture by reference to said accessed plurality of tabular specifications and associated specified logical relationships.

2. The method according to claim 1, further including the step of specifying within each of said plurality of tabular specifications a range of allowable values for at least one element contained therein.

3. The method according to claim 1, wherein at least one reference to a selected one of said plurality of tabular specifications is contained within a second tabular specification.

4. The method according to claim 1, further including the step of selectively altering the logical relationship between each of the elements contained within a particular accessed tabular specification in response to an access thereof.

5. A computer implemented method in a data processing system of defining the structure of a multi-element entity within a data stream, said computer implemented method comprising the steps of:

creating within said data processing system a plurality of tabular specifications, each of said tabular specifications including a plurality of elements;

specifying once for each of said plurality of tabular specifications the logical relationship between each of said plurality of elements contained therein and at least one other element contained therein;

storing said specified logical relationship in association with each of said plurality of tabular specifications;

accessing said plurality of tabular specifications and said associated specified logical relationships utilizing a reference which includes an indication of the semantic interpretation of the elements contained within at least one of said plurality of tabular specifications; and defining the structure of a multi-element entity within a data stream by references to said accessed plurality of tabular specifications and associated specified logical relationships.

6. The method according to claim 5, further including the step of specifying within each of said plurality of tabular specifications a range of allowable values for at least one element contained therein.

7. The method according to claim 5, wherein said reference which includes an indication of the semantic interpretation of the elements contained within at least one of said plurality of tabular specifications is contained within a second tabular specification.

8. The method according to claim 5, further including the step of selectively altering the logical relationship between each of the elements contained within a particular accessed tabular specification in response to an access thereof.

9. A data processing system for defining relationships among elements in a multidimensional architecture, said data processing system comprising:

means for creating within said data processing system a plurality of tabular specifications, each of said tabular specifications including a plurality of elements;

means for specifying once for each of said plurality of tabular specifications the logical relationship between each of said plurality of elements contained therein and at least one other element contained therein;

means responsive to said means for specifying for storing a specified logical relationship in association with each of said plurality of tabular specifications;

means, coupled to said storing means for accessing said plurality of tabular specifications and said associated specified logical relationships; and means responsive to said means for accessing for defining relationships among elements in a multidimensional architecture by reference to said accessed plurality of tabular specifications and associated specified logical relationships.

10. The data processing system for defining relationships among elements in a multidimensional architecture according to claim 9, further including means for specifying within each of said plurality of tabular specifications a range of allowable values for at least one element contained therein.

* * * * *